United States Patent
Bertetti

[11] Patent Number: 5,536,075
[45] Date of Patent: Jul. 16, 1996

[54] WHEEL HUB UNIT FOR A VEHICLE

[75] Inventor: Paolo Bertetti, Turin, Italy

[73] Assignee: SKF Industrie S.p.A., Turin, Italy

[21] Appl. No.: 193,842

[22] Filed: Feb. 9, 1994

[30] Foreign Application Priority Data

Feb. 9, 1993 [IT] Italy .................... TO93A0076

[51] Int. Cl.⁶ ........................................ B60B 27/00
[52] U.S. Cl. .................. 301/105.1; 180/254; 29/898.07; 384/537; 384/585
[58] Field of Search ............... 301/105.1, 124.1, 301/126, 131, 137; 180/254, 258, 259; 29/898, 898.04, 898.045, 898.054, 898.057, 898.061, 898.062, 898.07; 384/537, 544, 585

[56] References Cited

U.S. PATENT DOCUMENTS

| | | | |
|---|---|---|---|
| 1,213,509 | 1/1917 | Lee ......................... | 29/898.07 X |
| 2,101,130 | 12/1937 | Christman ................ | 29/898.07 X |
| 4,010,533 | 3/1977 | Pitner . | |
| 4,629,028 | 12/1986 | Krude et al. ............. | 180/259 |
| 4,784,441 | 11/1988 | Welschof et al. ........ | 301/126 |
| 4,835,829 | 6/1989 | Welschof et al. ........ | 301/105.1 X |
| 4,869,556 | 9/1989 | Gees ......................... | 301/124.1 |
| 4,887,917 | 12/1989 | Troster er al. ........... | 301/105.1 X |

FOREIGN PATENT DOCUMENTS

| | | |
|---|---|---|
| 0192339 | 1/1986 | European Pat. Off. . |
| 2294361 | 9/1976 | France . |
| 2088526 | 10/1981 | United Kingdom . |
| 2105001 | 8/1982 | United Kingdom . |

OTHER PUBLICATIONS

Patent Abstracts of Japan, vol. 10, No. 273 (M–518) 17 Sep. 1986 and JP-A-61 096 218 (NTN TOYO BEARING CO) 14 May 1986.
Three-page European Search Report.

*Primary Examiner*—Russell D. Stormer
*Attorney, Agent, or Firm*—Burns, Doane, Swecker & Mathis

[57] ABSTRACT

A wheel hub unit in which an inner ring of a rolling bearing acts as a wheel hub and is rigidly connected to an outer cap of a constant-velocity universal joint; the inner ring is formed by a first element having a first race for the rolling bodies and a sleeve-shaped connecting portion and a second annular element provided with a second race for the rolling bodies, which is fixed to a first length of the sleeve-shaped portion so as to be rigid for rotation therewith, the second element being in abutment with an axial shoulder of the first element adjacent the first race and being axially locked thereagainst by means of the plastic deformation of a stop member; the cap of the joint being coupled with a second, splined length of the sleeve-shaped portion on which it is axially snap engaged.

9 Claims, 3 Drawing Sheets

WHEEL HUB UNIT FOR A VEHICLE

BACKGROUND OF THE INVENTION

The present invention relates to a wheel hub unit particularly for a drive/steering wheel of a motor vehicle.

The wheel hub units of vehicle drive wheels are usually formed by the connection, with various degrees of integration, of a constant-velocity universal joint with a rolling bearing with two rings of balls, in which one of the rings of the bearing is adapted to fulfil the functions of a wheel hub while the other is fixed to the suspension strut (or itself fulfils the functions of the strut). The known solutions provide a simple mechanical coupling for the transmission of torque between the joint and the bearing, these latter remaining as two separate components or there being an integration of mechanical parts between the two components, with the use both of constant-velocity universal joints provided with a shank on which there is integrally formed at least one half-element of one of the rings of the bearing, and of bearings of which the inner ring, of suitably large dimensions and suitable conformation also fulfils the function of the outer cap of the joint (fourth generation units).

The integrated solutions reduce the number of component elements but are disadvantageous in the case of breakdowns of only one of the components of the unit (the bearing or the joint) in that they require the replacement of the entire unit with consequent increased costs. Moreover, the dimensions of the joint are constrained by the bulk of the bearing whereby it is not possible to use the same unit for vehicles (for example belonging to the same range) of substantially the same weight but of different powers, at least not without using a larger and heavier solution for the joint. When the inner ring of the bearing and the cap of the joint are formed as a single component, moreover, manufacture of the parts, assembly and testing of the unit are particularly complicated and onerous.

Finally, the known solutions make it impossible, or at least extremely difficult, to fit the wheel hub unit automatically to the vehicle since either the two elements (bearing and joint) must first be pre-assembled and handled as an inseparable unit or they are connected at the moment of assembly on the vehicle with the need to force fit the splined part of the joint in the hub and effect the axial clamping with a controlled torque on the assembly line, which operations are wasteful in terms of time and equipment.

SUMMARY OF THE INVENTION

The object of the invention is to provide a vehicle wheel hub unit which does not have the disadvantages described above and which, in particular, enables the bearing and the joint to be maintained mechanically separate but enables their combination to be treated equally well as an inseparable unit or as two sub-groups (wheel hub bearing and joint) which are separate but which can be coupled rapidly, according to the assembly requirements.

On this basis the invention provides a wheel hub unit for a vehicle, including a rolling bearing comprising in turn first and second support members mounted so as to be mutually rotatable and a double ring of rolling bodies interposed between said members, and a joint for transmitting torque to said first member of the bearing, which is formed as two mutually coupled circular elements and is shaped so as to define a wheel hub for a wheel of the vehicle; the joint including an outer cap rigidly connected to the first mender of the bearing; characterised in that a first element of the first member is provided with attachment means for the wheel and a first race for the rolling bodies and includes a sleeve-shaped connecting portion extending from an axial shoulder of the first element formed adjacent the said first race; and in that the second element of the first member, having an annular shape and being provided with a second race for the rolling bodies, is fixed to a first length of the sleeve-shaped portion of the first member so as to be rigid for rotation therewith, the second member being in abutment with said axial shoulder and being axially locked thereagainst by the plastic deformation of a stop member; the cap of the joint being coupled for rotation with a second length of the sleeve-shaped portion in a position immediately adjacent the second element.

More particularly the said joint is a constant-velocity universal joint, the second length of the sleeve-shaped portion that is coupled for rotation with the cap is a splined length and the cap is provided with a mating coupling portion which is axially snap-engaged on the said length.

In this case, the snap engagement is achieved by means of a resilient ring inserted with radial play in a groove formed inside the mating portion of the cap of the joint and snap-engageable in a corresponding groove formed in the second length of the sleeve-shaped portion of the first element of the first bearing member.

Similarly the snap-engagement may be achieved by a resilient ring inserted with radial play in a groove formed in the sleeve-shaped portion which engages a groove formed inside the mating portion of the cap.

Thus, the bearing unit plus the joint defined by the unit as a whole may be provided to the vehicle manufacturer in the form of a preassembled unit or in the form of two sub-groups (bearing-hub and joint) which can be assembled easily and rapidly. In both cases the in-line assembly operations are simple and hence easy to carry out automatically even by robotised equipment.

Moreover since an outer axial closure element and an operation for its axial clamping to the vehicle suspension during assembly are no longer necessary, it is possible to separate the joint from the hub whenever this operation is necessary for maintenance of the vehicle (replacement of the bearing alone or of the joint alone. This is not possible on the fourth generation units with an integrated joint). In addition, since the conventional system for the axial clamping of the joint with a nut and screw is eliminated, the problems of slackening, which often occurred in use and which could reduce the lifetime of the bearing or the rigidity of the wheel or could create noise, are also overcome.

Finally, a single type of bearing may be combined with different types of joint according to the torque to be transmitted and the same bearing may optionally be used for idle wheels (instead of drive wheels) without the need to use an outer axial closure element. This provides greater possibilities of economy and, compared with current solutions, a considerable reduction in weight for the same bulk and total interchangeability with current solutions.

Account should also be taken of the fact that the proposed solution for the coupling between the hub and the joint enables the use of a cap for the joint which does not have a shank and is off simplified form, with advantages in terms of weight and cost; this simplified form also gives possibilities of obtaining the cap by pressing techniques starting from sheet metal of a suitable thickness or from a piece of tube instead of by forging or moulding, which are more burdensome processes.

BRIEF DESCRIPTION OF THE DRAWINGS

Further characteristics and advantages of the invention will become apparent from the description of one embodiment which follows given purely by way of non-limitative example, with reference to the appended drawings, in which.

DETAILED DESCRIPTION OF THE INVENTION

Figure 1:
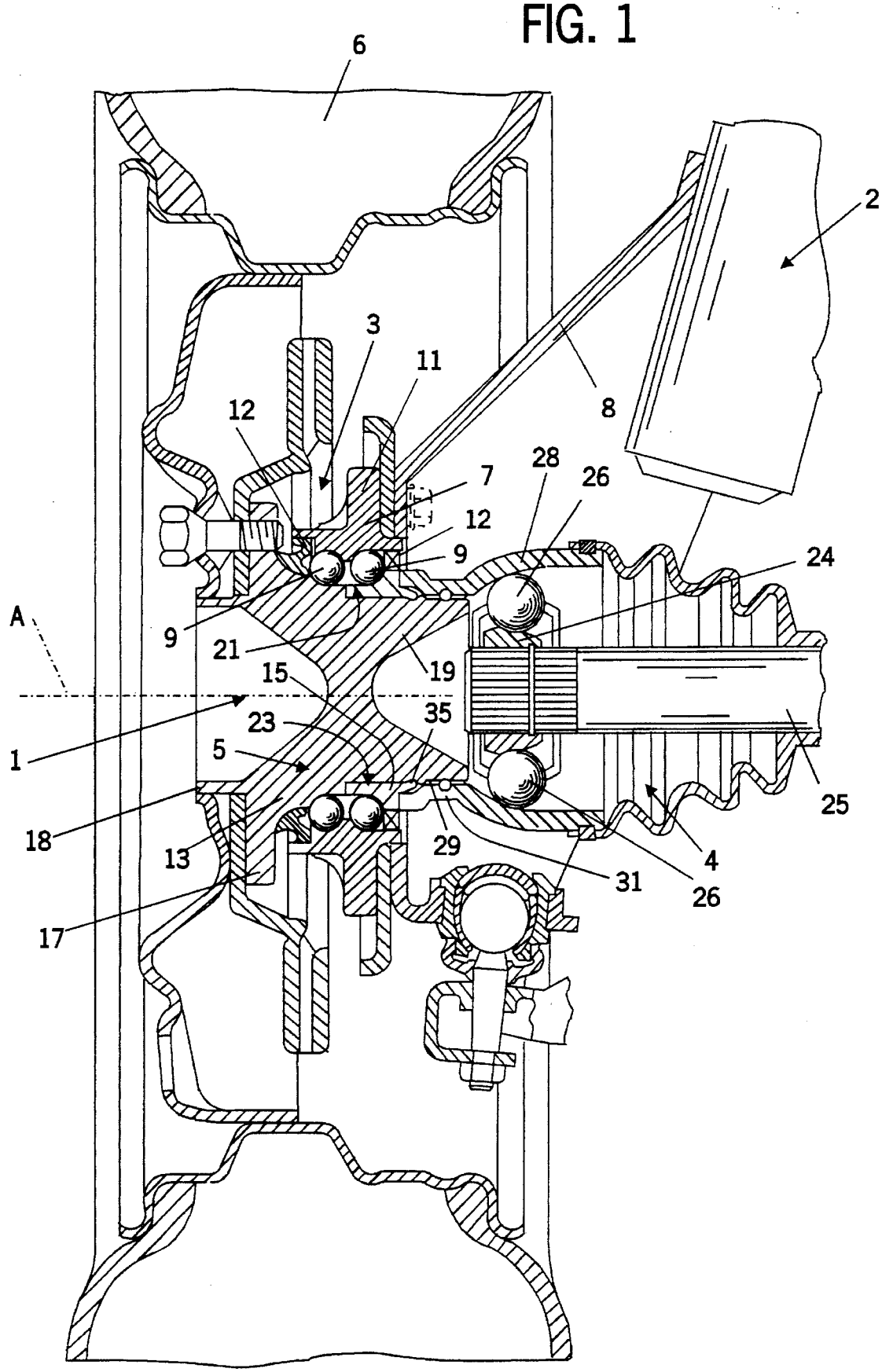
FIG. 1 is a sectioned elevational view of a vehicle suspension provided with a wheel hub unit according to the invention.

With reference to FIGS. 1 to 4, these show a wheel hub unit generally indicated 1 for a vehicle suspension 2 which is known and not illustrated for simplicity. The unit 1 includes a rolling bearing 3 and a constant-velocity universal joint 4 for the transmission of torque to a radially inner member 5 of the bearing 3 which is shaped so as to act as a wheel hub for a wheel 6 of the vehicle.

The bearing 3 includes the support member 5 for the wheel 6, a second support member 7 for the entire unit 1, adapted to allow its fixing to a strut 8 of the suspension 2, and a double ring of rolling bodies 9, in this case balls, interposed between the members 5, 7 to render them relatively rotatable with low friction about a common axis of rotation A. The member 7 is constituted by a conventional outer ring having an attachment flange 11 on its radially outer surface for attachment to the suspension 2 and housing within it, at its opposite end, respective known sealing members 12; the member 5, in accordance with the invention, is formed as two generally circular elements 13 and 15, of which the element 13, instead of being annular, is hub-shaped and provided with an attachment flange 17 for the wheel 6 and a guide and centring collar 18 therefor.

The element 13 has a first rolling track 20 for the rolling bodies 9 on its radially outer surface and includes a sleeve-shaped coupling portion 19 extending in the opposite direction from the collar 18 starting from an axial shoulder 21 of the element 13, which shoulder is formed adjacent the race 20 and at the opposite end from the collar 18. The element 15 on the other hand has a conventional annular shape and is provided on its radially outer surface with a second race 22 for the rolling bodies 9. In accordance with the invention, the element 15 is fitted with an interference fit on to a first length 23 of the portion 19 so as to be rigid for rotation therewith and abuts the shoulder 21 against which the element 15 is axially locked by plastic deformation of a stop member, as will become apparent.

The constant-velocity universal joint 4 includes an inner thrust-bearing 24 which can be coupled to an axle 25, rolling bodies 26, a bellows member 27 and an outer cap 28 (known) rigidly fixed to the radially inner member 5 of the bearing 3; in this case, the cap 28 is coupled for rotation with the element 13 on a second length 29 of the sleeve shaped portion 19 in a position immediately adjacent the element 15 and bears against the latter. In particular, the length 29 is a splined length (that is provided with a splined or multi-grooved coupling preferably obtained by rolling) and the cap 28 has a coupling portion 31 which mates with the splined length 29 and is locked axially on the length 29 by snap engagement as will be seen below.

Figure 3:
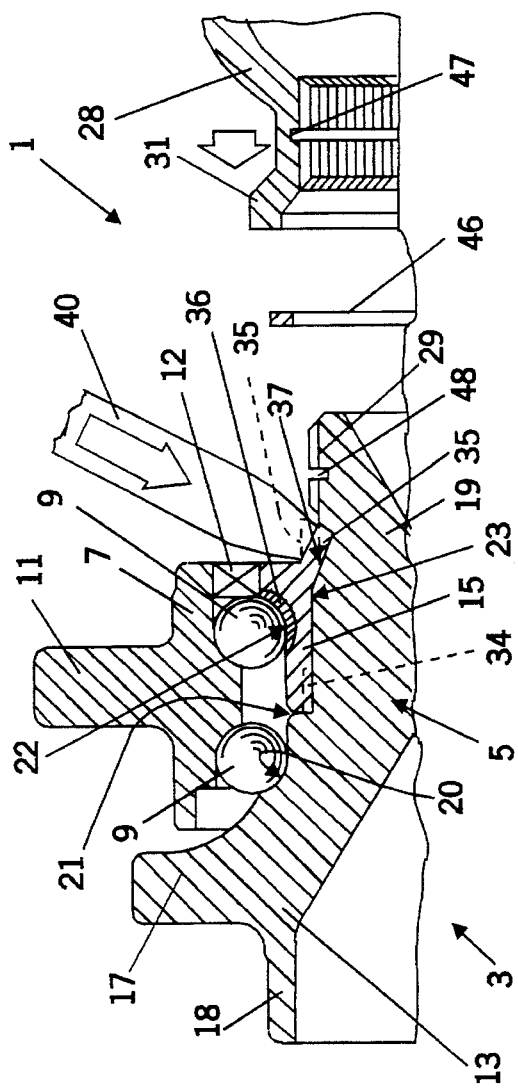
Figure 4:
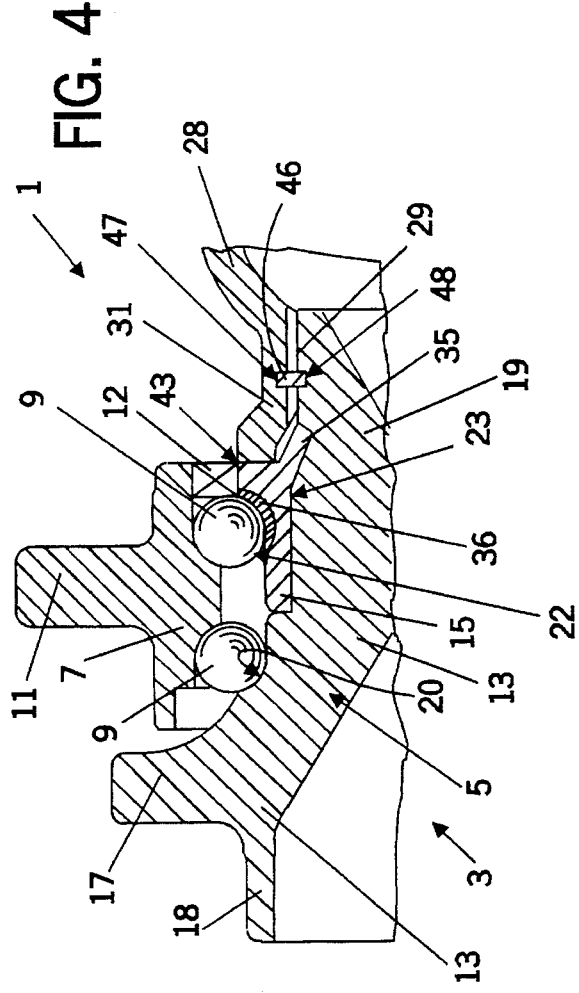

As illustrated in FIGS. 1, 3 and 4, the said stop member is constituted by an annular appendage 35 of the annular element or ring 15 which projects from the opposite end thereof from the race 22; in this case the element 15 is formed of a plastically deformable metal which can be hardened locally by tempering (for example a carbon steel or alloy of suitable composition) and is not tempered except in an annular region 36 (shown by narrower hatching) for example by induction hardening, in correspondence with the race 22; thus the appendage 35 is readily deformable, for example simply by rolling (FIG. 3), into an annular groove or channel 37 formed in the sleeve-shaped portion 19 between the lengths 23 and 29.

In this case the element 15 is fixed for rotation with the element 13 by means of an interference coupling formed by it being force fitted onto the length 23 of the sleeve-shaped portion 19 and by the projection of some of the material of the collar or appendage 35 which, upon rolling, creeps into the adjacent end of the splined portion 29.

Figure 2:
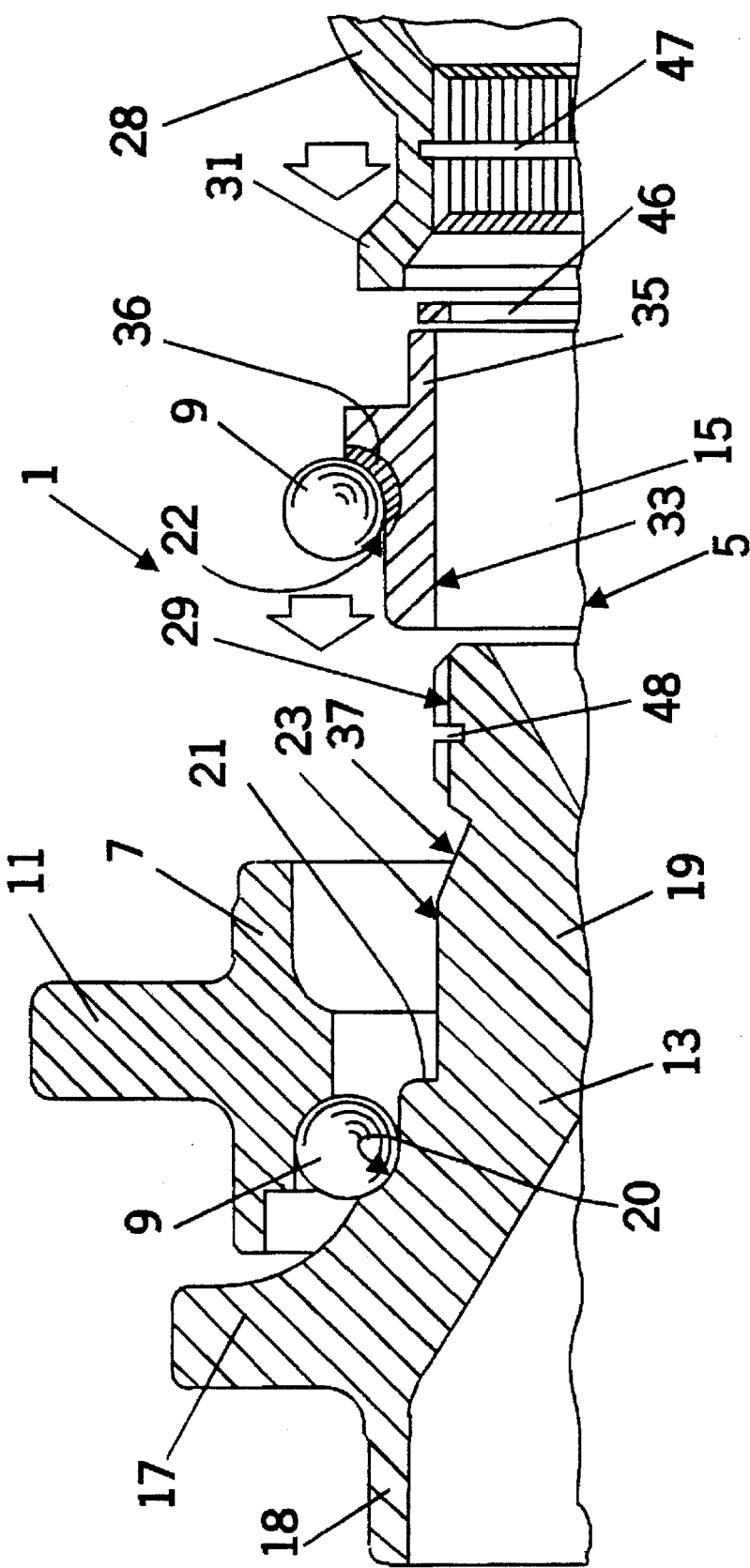
FIGS. 2, 3 and 4 illustrate schematically successive phases in the assembly of the wheel hub unit of FIG. 1.

In this case the groove 37 has a saw-tooth profile in a direction parallel to the axis A and is engaged by the stop element defined by the appendage 35 by the rolling or punching of the latter with a known tool 40 (FIG. 3) after the ring 15 has been fitted (for example in a press) onto the cylindrical length 23 so as to abut the shoulder 21 (FIG. 2). During this operation it is possible to exert a preloading force on the ring 15 in the direction of the arrow (FIG. 2), which preloading is then maintained, when the deformation is finished, by the insertion of the appendage 35 in the saw-toothed groove 37 which locks the ring 15 in a pack between the axial shoulders 21 and 37. This ensures that a predetermined pre-loading force is applied correctly to the rolling bodies 9 which are assembled in the races 20, 22 after the assembly of the member 7 and before the coupling of the elements 13, 15.

During the rolling of the appendage 35, as already stated, part of this projects out of the groove 37 towards the splined portion 29 and contributes to locking the ring 15 and the hub 19 together against relative rotation.

Figure 5:
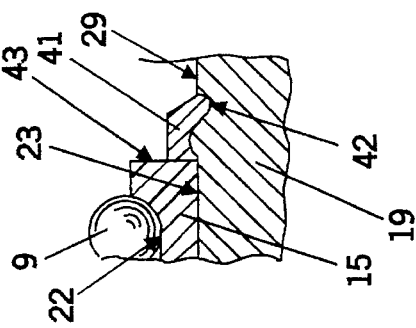
FIG. 5 illustrates a detail of a possible variant of the unit of FIG. 1.

With reference to FIG. 5, all identical result is obtained by the formation of the ring 15 without the appendage 35 and entirely tempered and by the formation of the stop member as a plastically deformable ring 41 which is axially locked within a groove 42 formed in the portion 19 of the element 13 between the lengths 23 and 29, in a position similar to the groove 37; once the ring 15 has been fitted against the shoulder 21, the ring 41 is fitted in known manner in the groove 41 and then deformed plastically, for example by the tool 40 or a like tool, being bent against a face 43 of the ring 15 opposite the shoulder 21.

For greater security, in both cases described and in particular in the second case of FIG. 5, the length 23 and an inner circumferential surface 33 of the element 15 may have mating coupling means for coupling them against relative rotation, for example constituted by splined or multi-grooved portions 34 (FIG. 3) of the type used for bolts.

The bearing 3 and the joint 4 can be snap-engaged in a releasable manner by means of a resilient ring 46 (FIGS. 2, 3, 4) inserted with radial clearance in a groove 47 formed within the mating splined portion 31 of the cap 28 and snap-engageable in a corresponding groove 48 formed in the splined portion 29 of the sleeve-shaped portion 19 of the element 13. Thus, after the ring 15 has been fixed to the element 13, it is possible (FIG. 4) to mount and snap-engage the cap 28 alone (or the entire joint 4) simply by the sliding of the splined portion 31 on to the splined portion 29 until it bears against the face 43 so as to form a unit which can be provided as such to the vehicle manufacturer. The same unit may be made, in the same manner as that described, that is with extreme simplicity and rapidity, even on the vehicle assembly line, with the elements 3 and 4 being handled separately and with the coupling of the portion 31-length 29 at the moment of fixing of the flange 11 to the suspension 2. Furthermore, in each case, the bearing 3 may be dismantled rapidly and snap-engaged from/on the joint 4 by the simple release of the flange 11 and then the relative axial sliding of the portion 31 and the length 29 along the axis A.

Obviously, a similar result would be obtained if the ring 46 were mounted in the groove 48 and then snap engaged in the groove 47 at the moment of coupling of the cap 28 and the length 29.

I claim:

1. A wheel hub unit for a vehicle, including a rolling bearing comprising:

first and second support members mounted to be mutually rotatable;

a first and second ring of rolling bodies interposed between said support members;

a joint for transmitting torque to said first support member of the bearing;

an outer cap covering the joint and having an axial coupling portion removably and rigidly connected to the first support member of the bearing;

wherein said first support member comprises first and second mutually coupled circular elements and is shaped to define a wheel hub for a wheel of the vehicle, and wherein the first element includes attachment means for attaching the bearing to the wheel, a first race for the first ring of rolling bodies, an axial shoulder adjacent to the first race, a sleeve-shaped connecting portion extending from the axial shoulder, and engaging means formed on the sleeve-shaped connecting portion, and the second element is annular shaped and includes a second race for the second ring of rolling bodies and a stop member, the second element being fixed to a first length of the sleeve-shaped portion of the first member so as to be rigid for rotation therewith, the second element being in abutment with said axial shoulder and being axially locked there against by engagement of the stop member with the engaging means, and wherein the outer cap is rigidly coupled to a second length of the sleeve-shaped portion for rotation therewith in a position immediately adjacent and bearing against the second element.

2. A wheel hub unit as claimed in claim 1, wherein the joint is a constant-velocity universal joint, the second length of the sleeve-shaped portion that is coupled for rotation with the cap is splined and the mating coupling portion of the cap is axially snap-engaged upon the second length.

3. A wheel hub unit as claimed in claim 1, wherein the second element is fixed to the first element for rotation therewith by interference fit obtained through force keying on said first length of the sleeve-shaped portion.

4. A wheel hub unit as claimed in claim 1, wherein the first length of the sleeve-shaped portion and an inner lateral surface of the second element are provided with mating coupling means for coupling them against relative rotation.

5. A wheel hub unit as claimed in claim 1, wherein the engaging means on the sleeve-shaped portion of the first element is an annular groove formed between said first and second lengths, the groove having a sawtooth profile in a direction parallel to an axis of relative rotation of the members.

6. A wheel hub unit according to claim 5, wherein the stop element is an annular appendage of the second element which extends therefrom at an opposite end from the second race, and wherein the second element is formed of a plastically deformable metal which is hardenable by tempering and having a tempered region only in correspondence with the second race wherein the annular appendage is easily deformable.

7. A wheel hub unit according to claim 6, wherein the second element is fixed to the first element for rotation therewith by engagement by plastic deformation of the annular appendage in a splined length of the sleeve portion, the engagement being achieved by projection of the annular appendage into the splined length after rolling and maintaining an axial pre-loading on the bearing.

8. A wheel hub unit according to claim 1, wherein the stop element is a plastically deformable ring mounted so as to be axially locked in a groove formed in the first element between the first and second lengths of the sleeve portion, and wherein the ring is bent to bear against a face of the second element opposite the axial shoulder of the first element.

9. A wheel hub unit according to claim 2, wherein the bearing and the joint are snap-engageable so as to be releasable, the unit comprising a resilient ring inserted with radial clearance in one of a groove formed inside the mating coupling portion of the cap of the joint and a groove formed in the second length of the sleeve portion of the first element of the first bearing support member, wherein upon engagement of the coupling portion of the cap with the second length of the sleeve portion, the resilient ring engages both grooves.

* * * * *